United States Patent [19]
Parrier et al.

[11] Patent Number: 5,390,066
[45] Date of Patent: Feb. 14, 1995

[54] PROTECTION DEVICE FOR ELECTRICAL APPLIANCES, MACHINES AND INSTALLATIONS

[76] Inventors: Henri Parrier; Jean Parrier, both of 41 Rue Marius Poncet, F-69290 St. Genis Les Ollieres, France

[21] Appl. No.: 941,070
[22] PCT Filed: Feb. 4, 1992
[86] PCT No.: PCT/FR92/00099
  § 371 Date: Oct. 8, 1992
  § 102(e) Date: Oct. 8, 1992
[87] PCT Pub. No.: WO92/14291
  PCT Pub. Date: Aug. 20, 1992

[30] Foreign Application Priority Data
Feb. 8, 1991 [FR] France .................. 91 01634

[51] Int. Cl.[6] ............... H02H 3/20; H02H 3/06
[52] U.S. Cl. ........................... 361/59; 361/78; 361/42; 364/483
[58] Field of Search .......... 361/42, 44, 45, 46, 361/47, 48, 49, 50, 54, 65, 78, 79, 94, 56, 60; 364/480–493, 492

[56] References Cited
U.S. PATENT DOCUMENTS

| | | |
|---|---|---|
| 4,053,876 | 10/1977 | Taylor .................. 340/253 H |
| 4,054,832 | 10/1977 | Reynolds et al. ............ 361/44 |
| 4,205,358 | 5/1980 | Washington ................ 361/44 |
| 4,364,007 | 12/1982 | Cutler et al. ............... 361/42 |
| 4,728,885 | 3/1988 | DeSanto .................. 364/481 |
| 5,003,486 | 3/1991 | Hendel et al. ............. 364/483 |
| 5,132,610 | 7/1992 | Ying-Chang .............. 364/483 |

FOREIGN PATENT DOCUMENTS
0384881 8/1990 European Pat. Off. .
3735012 4/1989 Germany .

OTHER PUBLICATIONS
World Intellectual Property Organization–WO 86/02786 Publication Date: 9 May 1986.

Primary Examiner—Jeffrey A. Gaffin
Assistant Examiner—Ronald W. Leja
Attorney, Agent, or Firm—Herbert Dubno

[57] ABSTRACT

User lines connected to power supply lines can be disconnected therefrom by a connect/disconnect switch. At least one resistor bridge connects the user lines and forms a connection point at a constant potential during normal operation of the load connected to the user lines. An isolation amplifier circuit element connected across this point and ground has its output side connected to a threshold circuit which, in turn, is controlled by a processor and through that processor operates the switch. The processor restores the connection after a time.

14 Claims, 5 Drawing Sheets

PROTECTION DEVICE FOR ELECTRICAL APPLIANCES, MACHINES AND INSTALLATIONS

CROSS REFERENCE TO RELATED APPLICATIONS

This application is a national phase of PCT/FR 92/00099 filed 4 Feb. 1992 and based, in turn, upon French application 91 01634 of 8 Feb. 1991 under the international Convention.

FIELD OF THE INVENTION

The present invention relates to a protection device for electrical appliances, machines and installations and, more particularly, to a device protecting electrical lines (termed "user" electrical lines), connected to electrical supply lines or the supply network.

In particular, the present invention applies to the safety of complete electrical installations in dwellings, to the protection of electronic or computer systems against excessive volt ages, and to the safety of the operators of electrical machines or appliances in industry or in any other field of activity.

BACKGROUND OF THE INVENTION

The devices known hitherto, of the circuit breaker or fuse type, do not allow electrical lines to be cut quickly enough to avoid electrocution or component deterioration. Moreover, their reaction time is too long to provide good protection in the case of a storm for example. Also, these systems protect only certain electrical lines but not the neutral or the ground line.

Other known devices measure a residual current with respect to the ground connection. For that reason, these devices are sensitive to parasites and their triggering threshold has to be high.

Moreover, all the devices quoted above do not reconnect the lines after they are triggered, which can be prejudicial to the operation of alarms, refrigerators, freezers and aquaria during long absences of the user or of the proprietor.

SUMMARY OF THE INVENTION

The present invention remedy these drawbacks by connecting together all the lines to be protected so as to create a potential line with a defined and constant value during the normal operation of the installation to be protected, detecting a variation in this potential with respect to the neutral, and automatically and rapidly cutting off and by the automatic and rapid cut-off of the supply to the lines to be protected as soon as a variation of the latter potential is detected.

The device which is the subject of the present invention is therefore a protection device for electrical appliances, machines and installations comprising user electrical lines to be protected, linked to electrical supply lines, and comprising in combination: at least one resistor bridge linking the user electrical lines and creating at one of its points a defined potential, which is fixed in the course of normal operation of the installation; isolation means linked to this point for amplifying the potential difference between this point and a ground or neutral line; a threshold circuit linked to the output of this isolation means; a processor connected to the output of this threshold circuit; and a means for connecting and disconnecting the supply lines with respect to the user electrical lines to be protected, the means being controlled by said processor in such a way that an abnormal voltage variation on one of the electrical lines gives rise to a variation in the potential at the abovementioned point, this variation being detected by the threshold circuit which transmits it to the processor, which then brings about the disconnection of the supply lines from the user electrical lines.

The operation of the device can be controlled by a digital circuit adding supplementary functions, and the triggering threshold may be adjustable.

According to one variant of the device of the invention, protection can be effected partially on some parts of an electrical installation. Moreover, the return of the installation to operation, by reconnection of the cut-off lines with the supplies, may be controlled by the device within a variable, stored time scale according to the number of line cut-offs already effected.

More generally, all the functions, such as thresholds and time delays may be programmed by the user.

One of the advantages of the device according to the present invention resides in that several grids or a multitude of lines may be simultaneously monitored by an electronic circuit or detection "card" and that the digital circuit is adapted to control several detection cards simultaneously. Consequently, whatever the number of transformers, inverters or electrical supplies of an electrical installation, each of its lines may be monitored by the device which is the subject of the present invention. Conversely, each line can be monitored individually and in parallel with all the others.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
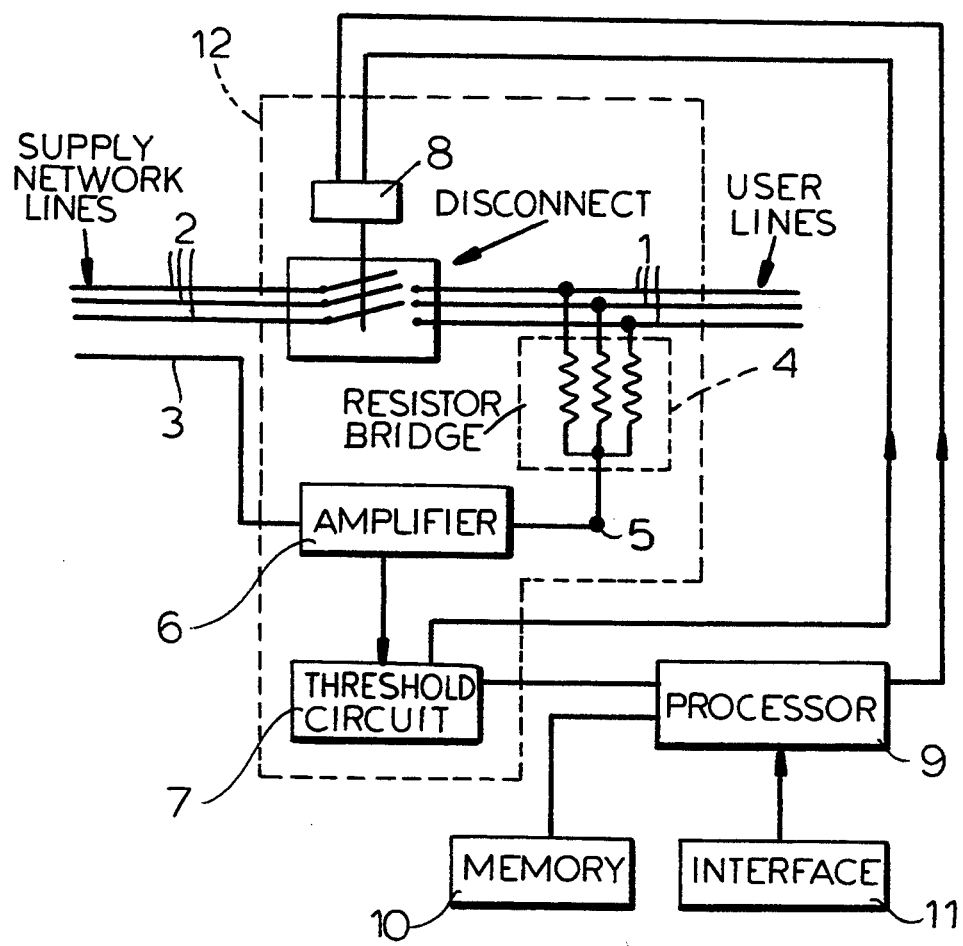
FIG. 1 is a block diagram illustrating the theory of the protection device according to the invention.

If reference is made first of all to FIG. 1, there are seen electrical lines 1 of a user installation linked to external electrical supply lines 2, a ground or neutral line 3, a resistor bridge 4 linking all the lines 1, a point of defined potential 5 of the bridge 4, an isolation and amplification means 6 linked to the point 5 and to the ground or neutral line 3, a threshold circuit 7 linked to the output of the isolation and amplification element 6, a means for connecting and disconnecting 8 the supply lines 2, with respect to the user lines 1, linked on the one hand to the threshold circuit 7 and on the other hand to a processor 9 which is itself linked to a memory 10, to an interface 11 and to the threshold circuit 7.

The resistor bridge 4, the potential point 5, the isolation means 6, the threshold circuit 7 and the connection and disconnection means 8 together constitute a detection card designated overall by 12.

The supply lines 2 and the ground or neutral line 3 are generally lines of the supply mains, especially from a three-phase AC grid or from a single-phase grid.

The potential point 5 is linked by the branches of the resistor bridge 4 to the lines 1 in such a way that its potential has a defined and fixed value, and, especially, is zero, when the lines 1 carry normal potentials.

Figure 2:
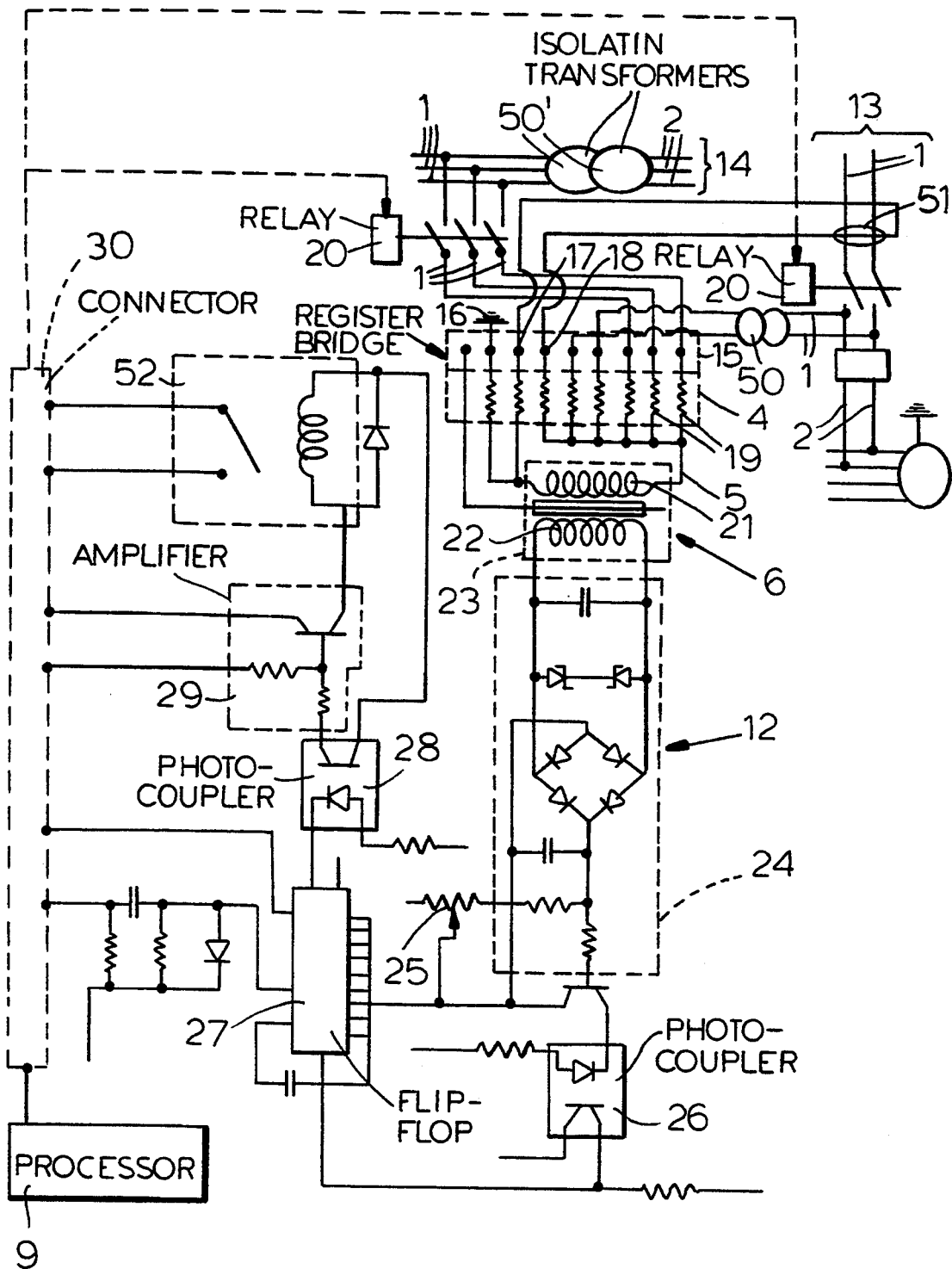
FIG. 2 is a circuit diagram of a detection card incorporated to the device of FIG. 1.
Figure 5:
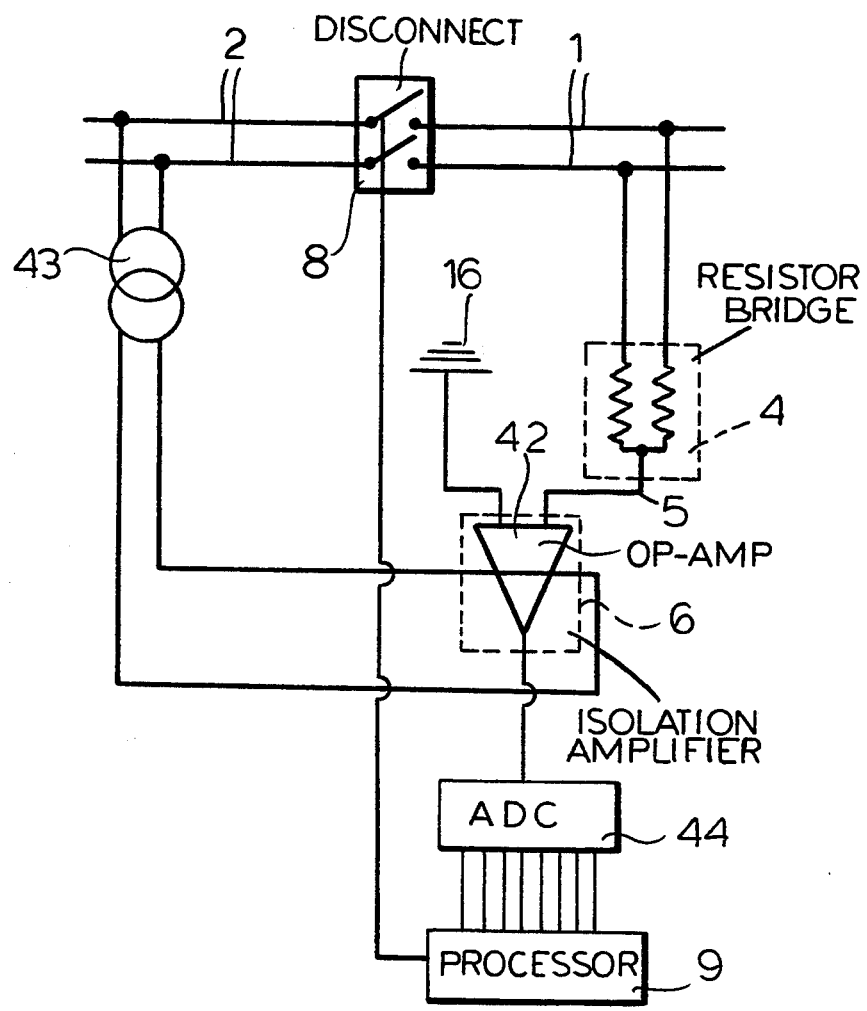
FIG. 5 is a circuit diagram of a detection card exhibiting the same functions as the card of FIG. 2 and constituting a variant thereof.

The isolation means 6 may, for example, be constituted by a transformer, such as represented in FIG. 2, or by an operational amplifier such as represented in FIG. 5. This isolation means 6 amplifies the potential difference between the point 5 and the earth or neutral line 3.

The threshold circuit 7 transmits a signal when the potential difference at the output of the isolation means 6, which difference is itself an image of the potential difference between the point 5 and the ground or neutral line 3, is greater than a predetermined value.

The connection and the disconnection means 8 may be constituted by relays, by electromagnetic or static contactors or by other electromechanical devices. It connects or disconnects the supply lines 2 to or from the user electrical lines 1.

Finally the processor 9 may be a computer, a microcontroller, a calculator or any other data processing means. It possesses an interface 11 allowing a dialogue between the user and the device. The processor 9 is programed according to a program which is kept in the memory 10 in order to control the operation of the elements of the device.

In general the interface 11 permits connection of a display means and of a keyboard. It also permits connection of the device with a data processing system or with recording means permitting transfer of the information contained in the memory 10. This information can especially relate to the incidents arising on the supply lines 2.

Exceeding of the predetermined threshold by the signal coming from the isolation and amplification means 6 triggers the disconnection of the user lines 1 from the supply lines 2.

The processor 9 arranges the reconnection of the lines 1 and 2 after a timing delay stored in the memory 10 and chosen by the user.

In this way, an abnormal voltage variation on one of the user electrical lines 1 gives rise to a variation in the normally-fixed potential of the point 5, this variation being detected by the threshold circuit 7 which transmits it to the processor 9, which arranges, at the means 8 to disconnect the user lines 1 from the supply lines 2.

If reference is made now to FIG. 2 shows an embodiment of the detection card 12. For a better understanding of the invention two grids are represented here, namely a single-phase grid 13 and a three-phase grid 14. One of the advantages of the invention is, in fact, that several types of different grids may be protected simultaneously by the same detection card 12.

The grids 13 and 14 each comprise electrical supply lines 2 and user electrical lines 1 separated by a relay 20. The user lines 1 of the three-phase grid 14 are linked to a connector 15, linked moreover to ground 16 and to a torus 51 by supply lines 17 and 18, as well as to an isolating transformer 50. The resistor bridge 4 is thus linked directly to the lines 1 of the three-phase grid 14, coming from a three-phase isolating transformer 50' which is itself linked to the supply lines 2, while the isolating transformer 50 is inserted between the bridge 4 and the lines 1 of the single-phase grid 13. The transformer 51 is a torus arranged around the two lines 1 of the single-phase grid 13, with neutral to ground.

The resistor bridge 4 links all the lines 1 to a primary 21 of a toric voltage step-up transformer 23, used as an amplifier. The secondary 22 of this transformer 23 is linked to a rectifier circuit 24. The output signal from the rectifier circuit 24 as well as a potential value which is fixed by a potentiometer 25 are conveyed to a photocoupler 26 which is itself linked to a flip-flop 27. The output of the flip-flop 27 is linked by a photocoupler 28 to an amplifier 29 which is linked to a contactor 52.

Finally, a connector 30 is adapted to link the processor 9 to the detection card 12 in such a way that the processor 9 controls the flip-flop 27 and the relays 20, and ascertains the position of the contactor 52.

It will be understood that the transformer 23 and the photocouplers 26 and 28 serve to isolate the various functions of the detection card 12, the transformer 23 amplifying the signal furnished by the bridge 4. An imbalance in this bridge 4 gives rise to the appearance of a current passing into the point 5 and of a potential at the terminals of the secondary 22 of the transformer 23. This potential difference is rectified by the circuit 24 and according to the value of a threshold fixed by the potentiometer 25, the flip-flop 27 changes state and gives rise to the opening of the relays 20 by the intermediary of the contactor 52.

In comparison with FIG. 1, it will be understood that the isolation and amplification means 6 is here constituted by the transformer 23. The threshold circuit 7 is constituted by the rectifier circuit 24 and the potentiometer 25, and the connection and disconnection means 8 by the flip-flop 27 associated with the contactor 52 and the relays 20.

For an optimal embodiment of the device of the invention, the primary 21 of the transformer 23 must be adapted to function from 1 to 2 milliamperes. In this way any insulation fault in one of the lines 1 with respect to the ground 16 is detected and gives rise to the disconnection of the lines 1 with respect to the lines 2.

The single-phase isolation transformer 50 makes it possible to detect the overvoltages appearing on the lines 1 and then to trigger the electrical disconnection of the lines 1 from the lines 2. The neutral of the primary of the transformer 50 is linked (by a conductor which is not represented) to the supply line 17 which is also linked to the transformer 51; hence there is available a reference loop permitting operation of the device even if the ground connection does not exist on the user installation side, thereby offering additional safety.

The torus 51 makes it possible to detect the insulation faults in the lines 1 with respect to ground. In fact, an insulation fault between a line 1 and the ground 16 gives rise to an overvoltage between the supply lines 17 and 18 of the torus 51, which overvoltage is detected by the threshold circuit 7.

The torus 51 may be specially adapted to give the device a sensitivity of two milliamperes. For example, these two milliamperes may, at the output of the torus 51, correspond to thirty millivolts. Such a triggering threshold permits excellent protection of personnel without risking triggerings due to parasites on the grid.

Another advantage of this embodiment is that the short-duration parasites appearing on the lines 1 do not give rise to disconnection, the energy corresponding to these parasites being insufficient to trigger the operation of the photocoupler 26.

Figure 3:
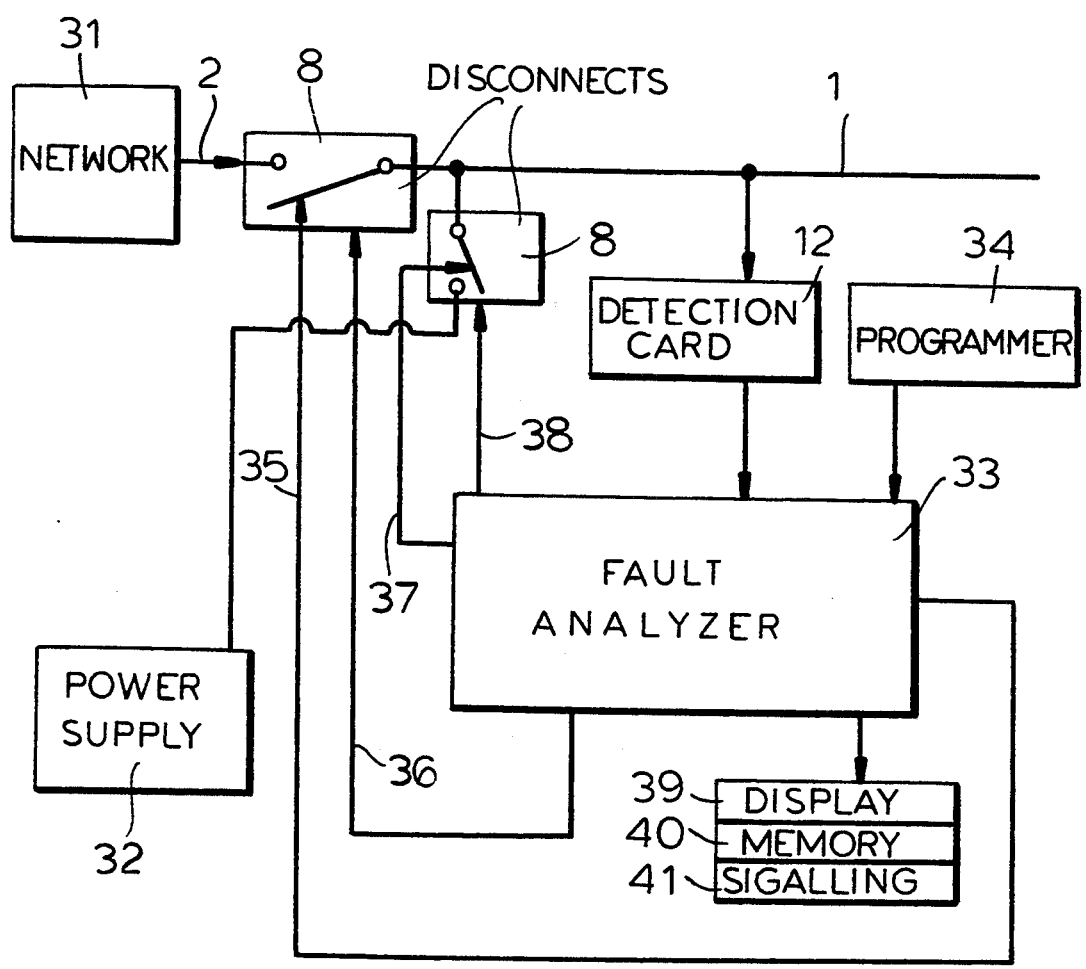
FIG. 3 is a block diagram illustrating the operation of the device.

Referring now to FIG. 3, an organizational diagram for operation of the device according to the invention is seen. This organizational diagram makes it possible, in particular, to detail the programming of the processor 9 and the means making it possible to produce variants of the embodiment described with reference to FIGS. 1 and 2.

FIG. 3 shows user lines 1 linked to supply lines 2 of the mains 31 and to a self-contained supply source 32 by connection and disconnection means 8, and to a detection card 12. A fault analyzer 33 is linked by its inputs to the detection card 12 and to a programing means 34. At its outputs it supplies signals 35 for disconnecting and signals 36 for reconnecting the mains and signals 37 disconnecting, and signals 38 for reconnecting 38 the self-contained supply 32, and display 39, memory 40 and signaling 41 signals.

The detection means 12 is constituted by one of the cards represented in FIGS. 2 or 5, the second card being, however, preferred (see description below).

The self-contained supply source 32 is constituted by a battery, an invertor or other electrical generating means. The fault analyzer 33 analyzes the overvoltages, the carrying currents, the parasitic signals, the microbreaks, and the voltage or frequency variations, especially on the lines 1. These data are stored in memory, displayed or signaled on the basis of their importance or of their repetition.

The connection of the self-contained supply 32 and the associated disconnection from the mains 31 are, for example, arranged for when a microbreak lasts longer than one second. A reconnection signal 36 or 38 is given, after a disconnection, within a standby time delay which is stored in memory by programing. However, this time delay may be variable as a function of the information previously stored in memory. For example, after ten reconnections carried out in a certain time, the time between the disconnection and the reconnection can be lengthened in order to protect the electrical systems linked to the lines 1.

It should be noted that several detection cards 12, each linked to a given electrical system, may be connected to a single fault analyzer 33. The fault analyzer then stores in memory an identification of the detection card which supplies it with the fault signals.

In order that the fault analyzer 33 obtain the information on the state of the lines 1, several means may be utilized.

On the one hand, for the detection of overvoltages, a high resistance, for example of 1 megohm, may be connected in series with a photocoupler to the lines 1. The photocoupler may be connected at the output with several threshold comparators adjusted to different values, the output of the comparators being linked to an interruption line of the processor 9.

On the other hand, for the detection of undervoltages, it is possible to add a low-pass filter between the photocoupler linked to the overvoltage measurement and a comparator.

Finally, frequency measurement may be carried out by counting the zero crossings of the voltage of the lines 1. A counter linked to a clock and a comparator enable this function to be readily carried out.

The programing means 34 is, for example, constituted by a keyboard.

An adjustable threshold may be produced by the use of a field-effect transistor linked to a digital-analog convertor whose input is linked to the processor 9. This adjustable threshold may also be produced by the use of several resistors of different values, one of these resistors being selected by a switch linked to the processor 9.

This organizational diagram and the description of FIG. 1 make it possible to produce the processor 9. To this end, reference may be made to the structure of signal processing cards and of microprocessor cards.

Figure 4:
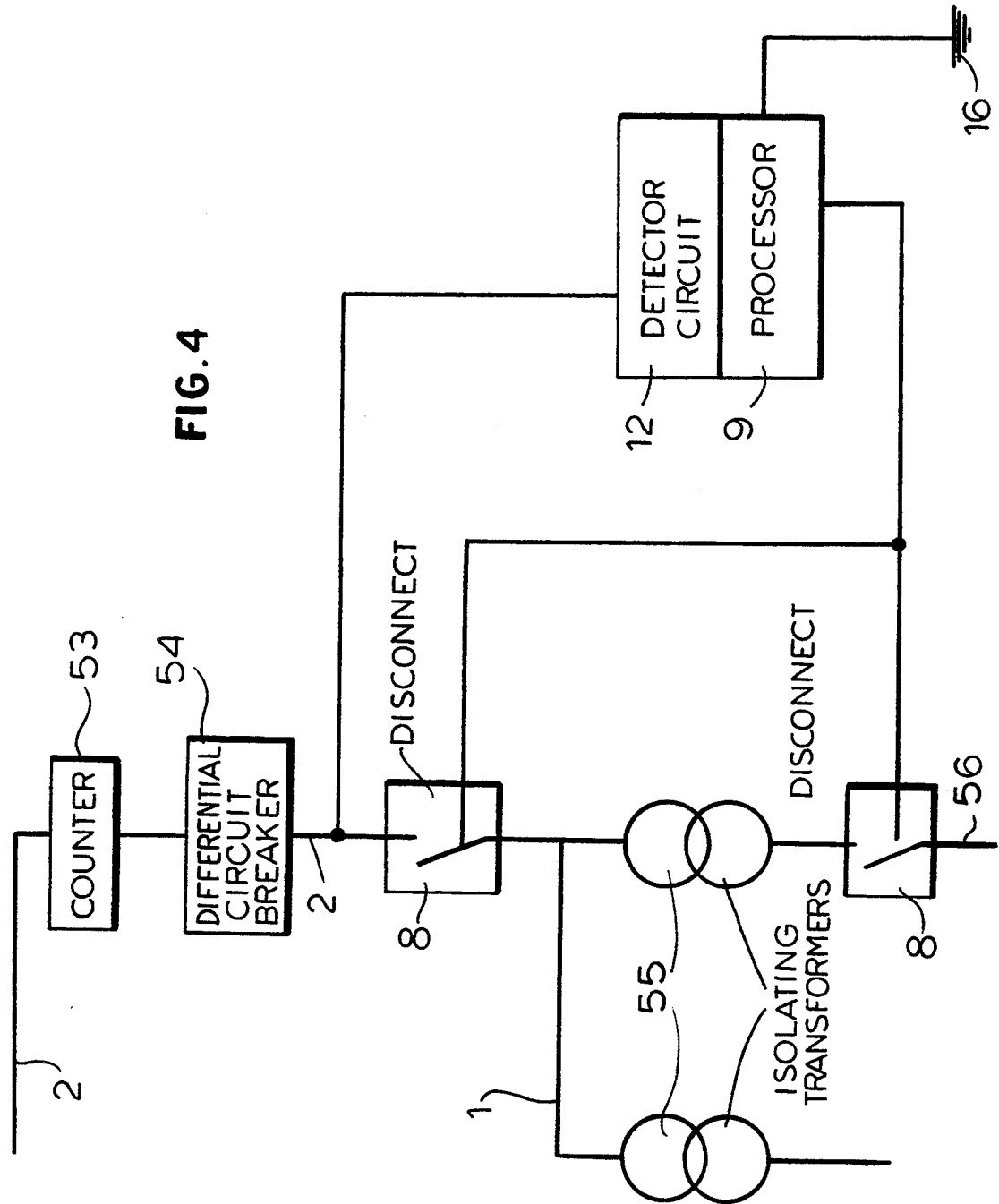
FIG. 4 is a block diagram showing the connection of the device of FIG. 1 to an electrical distribution network.

If reference is made to FIG. 4 the connections of a device to a single-phase or three-phase distribution grid are seen.

FIG. 4 shows, linked together successively, distribution lines 2, a counter 53, a differential circuit breaker 54, a connection and disconnection means 8, a isolating transformer 55, another connection and disconnection means 8 and one of the supply lines of an electrical installation 56. A detection circuit 12 is connected to the lines 2. The processor 9 is linked to this detection circuit 12, to ground 16 and to the connection and disconnection means 8.

According to this insertion of the device into the electrical installation of a premises linked to a distribution grid, reconnection is done in two stages, in such a way that the electrical systems linked to the electrical lines 1 are protected.

FIG. 5 represents another detection card 12 which may replace the one which is represented in FIG. 2, the application to a singlephase grid represented here not being limitative.

One of the characteristics of the invention consists in the electrical isolation of the bridge 4 and of the output of the isolation and amplification means 6, the device exhibiting a very great sensitivity by virtue of this electrical decoupling. Any supply of the threshold circuit 7 which might be common to one of the lines 1 would degrade this sensitivity.

In FIG. 2, the threshold circuit 7 is electrically supplied by the toric transformer 23, in which the primary 21 and the secondary 22 are isolated from one another.

Other supply means for the threshold circuit 7 which are electrically isolated from the bridge 4 are possible: supply by solar cell, by a cell, by a battery, by an accumulator or by transformer.

In FIG. 5 the supply means of the threshold circuit are constituted by a transformer, which is distinct from the isolation and amplification means 6. In this FIG. 5 are seen electrical supply lines 2 separated from user electrical lines 1 by a connection and disconnection means 8, a resistor bridge 4 comprising a point of normally-fixed defined potential 5, linked to the input of an operational amplifier 42, this amplifier 42 being supplied by a transformer 43 linked to the lines 2, the output of the operational amplifier 42 being linked to an analog-digital convertor 44 which is itself linked to the processor 9, which is linked to the connection and disconnection means 8. The amplifier 42 thus supplied constitutes the isolation and amplification means 6.

one of the the advantages of this latter embodiment resides in that the processor 9 may analyze the irregularities of the potentials carried by the lines 1 by virtue of digital values. Analysis of the overvoltages, or microbreaks and of frequency changes is then made possible.

Other embodiments suggested by the remarks given with respect ot FIG. 5 make it possible to produce other devices in accordance with the spirit of the invention.

It should be noted that the device produced according to the description of FIGS. 1 to 5 may make it possible to detect electrical impacts due to lightning within a radius of 50 kilometers from its impact point.

The interface 11 of the processor 9 also permits the output of information to a printer, or to a modulator-demodulator. The memory storage of the abnormal events being produced on the lines 1 also permits analysis by experts in cases of disputes with the electricity supplier, or in the event of deterioration of appliances under guarantee or under a maintenance contract.

It should be noted that the protection device which is the subject of the present invention should preferably comprise a detection circuit in front of each appliance which is sensitive to variations in supply and upstream and downstream from each transformer, or inverter of the protected electrical installation. Moreover, each line 1 may be monitored by a particular detection card 12.

It goes without saying that the present invention is not intended to be limited to the above description of some of its embodiments, which are able to undergo a certain number of modifications without in any way departing from the scope of the invention.

We claim:

1. A protection device for an electrical machine appliance or installation, comprising:
   a connect/disconnect switch connected between a plurality of supply lines and respective user lines to be protected and connectable to a load;
   a resistor bridge connected to said user lines and having a connection point at a defined potential which is constant during a normal operation of said load;
   an isolating amplifying circuit element having an input side connected across said connection point and a neutral point which can be at a ground potential, and an output side electrically isolated from said input side and outputting an amplified signal representing a potential difference between said points;
   a threshold circuit connected to said output side of said isolating amplifying circuit element; and
   a processor connected to an output of said threshold circuit and connected with said connect/disconnect switch for automatically disconnecting said user lines from said supply lines upon a variation of the potential difference detected by said threshold circuit, and for automatically reconnecting said user lines with said supply lines upon elimination of said variation of the potential difference detected by said threshold circuit.

2. The device defined in claim 1 wherein said isolating amplifying circuit element is a voltage step-up transformer having a primary forming said input side and a secondary forming said output side.

3. The device defined in claim 1 wherein said isolating amplifying circuit element includes an operational amplifier having an input connected across said points and supplied by a transformer connected to said supply lines.

4. The device defined in claim 1 wherein said resistor bridge is so constructed that said connection point is at zero potential in the normal operation of said load.

5. A protection device for an electrical machine appliance or installation, comprising:
   a connect/disconnect switch connected between a plurality of supply lines and respective user lines to be protected and connectable to a load;
   a resistor bridge connected through an isolation transformer to said user lines and having a connection point at a defined potential which is constant during a normal operation of said load;
   an isolating amplifying circuit element having an input side connected across said connection point and a neutral point which can be at a ground potential, and an output side electrically isolated from said input side and outputting an amplified signal representing a potential difference between said points;
   a threshold circuit connected to said output side of said isolating amplifying circuit element; and
   a processor connected to an output of said threshold circuit and connected with said connect/disconnect switch for automatically disconnecting said user lines from said supply lines upon a variation of the potential difference detected by said threshold circuit, and for automatically reconnecting said user lines with said supply lines upon elimination of said variation of the potential difference detected by said threshold circuit.

6. The device defined in claim 5 wherein said processor includes means for adjusting a threshold value in said threshold circuit.

7. The device defined in claim 5 wherein a plurality of said rectifier bridges are provided each with respective isolating amplifying circuit elements and threshold circuit and connect/disconnect switch, all operated by a single said processor.

8. The device defined in claim 5 wherein said processor is provided with an interface for a keyboard or display.

9. The device defined in claim 5, further comprising a memory connected to said processor and retaining information on incidents arising on said supply lines.

10. The device defined in claim 5 wherein a flip flop is connected between said threshold circuit and said switch.

11. The device defined in claim 10, further comprising at least one photocoupler between said threshold circuit and said flip flop.

12. The device defined in claim 10, further comprising at least one photocoupler between said flip flop and said switch.

13. The device defined in claim 5 wherein said resistor bridge has branches connected by respective lines to a toroidal transformer extending around two of said user lines of a single phase system with the neutral point at ground potential;
   said toroidal transformer signaling an insulation fault between ground and one of said user lines.

14. The device defined in claim 13 wherein the primary of the isolation transformer is connected to said toroidal transformer.

* * * * *